UNITED STATES PATENT OFFICE.

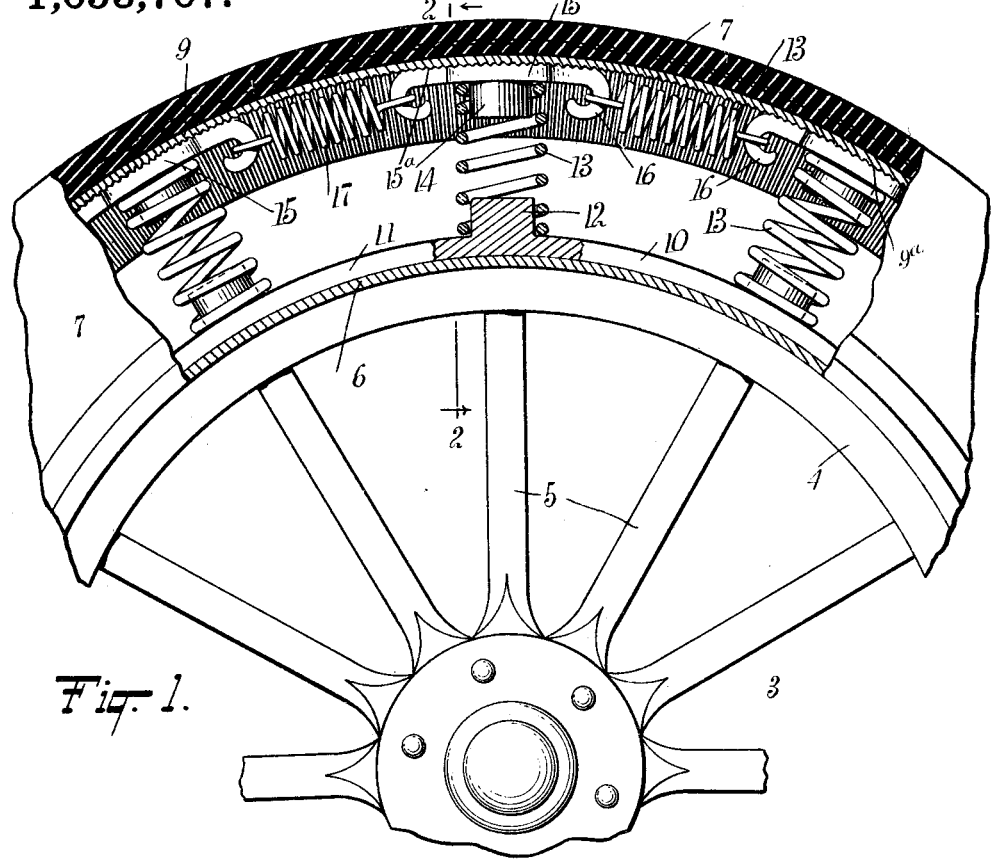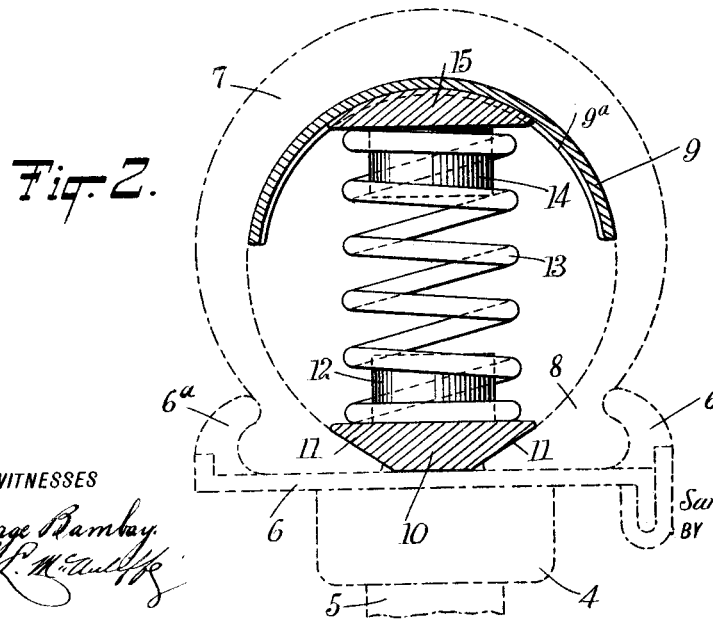

SAMUEL J. CASEY, OF KEESEVILLE, NEW YORK.

SPRING-TIRE FOR VEHICLE-WHEELS.

1,053,707.  Specification of Letters Patent.  Patented Feb. 18, 1913.

Application filed April 5, 1912. Serial No. 688,606.

*To all whom it may concern:*

Be it known that I, SAMUEL J. CASEY, a citizen of the United States, and a resident of Keeseville, in the county of Essex and State of New York, have invented a new and Improved Spring-Tire for Vehicle-Wheels, of which the following is a full, clear, and exact description.

The invention relates to metallic springs for tires to be used as a substitute for pneumatic tubes.

An object of my invention is to provide a tire of the general character referred to, in which the various members constitute a unit, the elements of which are so formed and arranged as to permit of the unit being quickly placed within the ordinary shoe.

A further object is to provide a spring unit for use with the ordinary shoe, and so formed and arranged as to co-act with the usual clencher rim and be maintained in place by said rim, the clencher members on the rim co-acting with an inner clamp ring of my improved unit to clamp the shoe between the clencher members of the wheel rim and said inner clamp ring of my spring unit.

A further object is to equalize the tension of the spring members entering into the improved spring unit.

The distinguishing features of my invention and the important structural elements characterizing the preferred embodiment which is illustrated as an example, will be more particularly explained in the specific description hereinafter to be given.

Reference is to be had to the accompanying drawings forming a part of this specification, in which similar characters of reference indicate corresponding parts in both views.

Figure 1 is a side elevation of a portion of a vehicle wheel having my improved tire unit, parts being broken away and in section: and Fig. 2 is a transverse section taken through the line 2—2 in Fig. 1.

The vehicle wheel 3 is of ordinary form, comprising a felly 4 and spokes 5, the felly 4 being provided with a rim 6 of approved form having at the sides the annular clencher members or rings 6ª, which in practice may be formed either integrally with the rim 6 or be demountable, both forms being well known. The clencher rings 6ª clamp the shoe 7 by engaging the clencher flanges 8. Co-acting with the clencher rings and the shoe, and within the shoe to act as a substitute for a pneumatic tube, is my improved unit, the elements of which, in the illustrated example, comprise a continuous outer rim 9, semi-circular in cross section, and an inner continuous rim 10, both of which are desirably rigid. The inner rim 10 is wedge-shaped, the sides 11 being beveled and converging inwardly, and acting to bear against the inner surfaces of the clencher flanges 8 of the shoe 7; whereby the clencher flanges 8 of the shoe will be clamped firmly between the clencher rings 6ª and the beveled sides of the inner rim 10, and in this way my improved spring unit, it will be seen, is held in place by the usual clencher device without the employment of fastening means such as bolts, screws, or the like, or adventitious clamps. Projecting from the inner rim 10 are spaced radial studs 12 in annular series around said rim 10, and seated on the rim 10 and surrounding the studs 12 radial compression springs 13 are provided, the outer ends of said springs surrounding inwardly projecting radially-disposed studs 14′ in line with the studs 12. The studs 14 project from the inner side of blocks 15 having eyes or hooks 16 at opposite sides, said blocks seating by their outer transversely convexed faces against the concave inner surface of the transversely curved outer rim 9 of my spring unit. The blocks 15 with their eyes or hooks 16, constitute links which are connected by tension springs 17, the said links and springs alternating and being formed into a continuous chain, extending annularly within the rim 9. The blocks 15 are in frictional engagement with the inner surface of the outer rim 9, while the outer surface of said rim is in frictional contact with the inner surface of the shoe 7.

It is obvious that as the wheel rotates the weight is successively received on the compression springs, and that the independent link blocks 15 and springs 17 distribute the strain. It will be apparent also that the complete unit may be readily placed within the shoe and quickly removed with less inconvenience than attends even the replacing of an inner pneumatic tube.

To prevent the possibility of creeping, the outer rim 9 may be corrugated as at 9ª, and a similar corrugation 15ª formed on the blocks 15, or any other equivalent inter-engagement or roughened contact surface is provided.

Having thus described my invention, I claim as new and desire to secure by Letters Patent:

1. In a spring tire, an inner element extending annularly, compression springs on the said inner element, an outer rim and means extending annularly of the tire outside of the compression springs and comprising a series of elements connected in chain form, certain of such elements consisting of tension springs interposed between other elements of the chain, and the said other elements being interlocked with the outer rim.

2. In a spring tire, inner and outer rims, interposed compression springs between said rims, a series of elements within the outer rim, said elements and the outer rim having inter-engaging serrations on their opposed faces, and a series of springs alternating with said elements and connected therewith.

3. A spring unit for tires, comprising an outer, transversely curved rigid rim, an inner rigid rim, compression springs between the said rims, and a chain within the inner rim and composed of independent blocks and alternate springs connecting said blocks, the compression springs bearing at their outer ends against the said blocks and pressing the same into frictional engagement with said outer rim.

4. In a spring tire unit for vehicle wheels, the combination of an outer transversely curved rigid rim, an inner rigid rim, the sides of the said inner rim converging toward the inner side, an annular series of studs on the inner rim, compression springs mounted on the inner rim at the said studs, a continuous chain consisting of alternate retractile springs, and blocks having eyes at the opposite side connected with the ends of the said retractile springs, the said blocks being convexed transversely at the outer surface and lying against the inner surface of the outer rim, studs on the said blocks, and compression springs between the said studs and the annular series of studs on the inner rim.

In testimony whereof I have signed my name to this specification in the presence of two subscribing witnesses.

SAMUEL J. CASEY.

Witnesses:
 EDWARD MCALOON,
 FRANK MARTIN.